United States Patent
Sadana

(10) Patent No.: US 6,453,429 B1
(45) Date of Patent: Sep. 17, 2002

(54) METHOD AND APPARATUS FOR BUS HANG DETECTION AND IDENTIFICATION OF ERRANT AGENT FOR FAIL SAFE ACCESS TO TRAPPED ERROR INFORMATION

(75) Inventor: Sumit Sadana, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/301,948

(22) Filed: Apr. 29, 1999

(51) Int. Cl.[7] .......................... H02H 3/05; H03K 19/003
(52) U.S. Cl. ............................................ 714/43; 714/56
(58) Field of Search .............................. 714/43, 44, 47, 714/48, 56; 710/15, 108

(56) References Cited

U.S. PATENT DOCUMENTS

| | | | | |
|---|---|---|---|---|
| 4,263,649 A | * | 4/1981 | Lapp, Jr. ..................... | 710/107 |
| 4,298,934 A | | 11/1981 | Fischer ........................ | 364/200 |
| 5,513,337 A | | 4/1996 | Gillespie et al. ............. | 395/479 |
| 5,548,746 A | | 8/1996 | Carpenter et al. ........... | 395/500 |
| 5,564,036 A | | 10/1996 | Sugai .......................... | 395/479 |
| 5,617,557 A | | 4/1997 | Stevens ....................... | 395/473 |
| 5,657,445 A | | 8/1997 | Pearce ......................... | 395/186 |
| 5,657,475 A | | 8/1997 | Gillespie et al. ............. | 395/490 |
| 5,864,653 A | * | 1/1999 | Tavallaei et al. ............. | 395/181 |
| 5,933,614 A | * | 8/1999 | Tavallaci et al. ............. | 395/309 |
| 6,032,271 A | * | 2/2000 | Goodrum et al. ............. | 714/56 |
| 6,249,885 B1 | * | 6/2001 | Johnson et al. ............... | 714/47 |

* cited by examiner

Primary Examiner—Dieu-Minh Le
(74) Attorney, Agent, or Firm—Floyd A. Gonzalez; Lily Neff

(57) ABSTRACT

A method and apparatus for detection of a bus hang with identification and capturing of errors in a network computing environment having at least one bus. A first and a second unit are in processing communication with one another in the environment and both units are capable of transferring data between one another. A status circuit is provided for monitoring the first and second units as well as a counting circuit that is measuring periods of bus inactivity during an active bus transfer sequences. A compare circuit is in processing communication with the first and second units for comparing threshold counts provided with a threshold value circuit. Finally, an error detector mechanism that is responsive to the threshold circuit is provided, capable of detecting a bus hang condition, where the detector asserts an error indication when appropriate.

21 Claims, 8 Drawing Sheets

METHOD AND APPARATUS FOR BUS HANG DETECTION AND IDENTIFICATION OF ERRANT AGENT FOR FAIL SAFE ACCESS TO TRAPPED ERROR INFORMATION

FIELD OF THE INVENTION

This invention relates generally providing to reliability and data integrity in computer systems with shared memory, and more particularly to bus protocols where information is transferred in multiple cycles allowing idle cycles.

BACKGROUND OF THE INVENTION

Typical server systems need to be connected to a variety of adapters to provide connectivity and high speed access to data. One prevalent means of doing so is through a local bus, such as the PCI bus (Peripheral Component Interconnect). The PCI bus supports multiple adapters on a single bus, and provides high data transfer capabilities. Example adapters could provide network connectivity or high speed access to data. One adapter might provide Fibre Channel connectivity another might provide (IBM) ESCON connectivity. These connections might provide connectivity to DASD storage, network switches or other devices known in the art. The Local Bus (such as PCI in this example) connection of these Adapters permits flexibility in configuring a system since a variety of adapter functions can be chosen that best fit the system requirement. These adapters are normally plug able modules or cards but some could be "hard wired" into the system or could be cable connected as is known in the art.

Consider a configuration where multiple adapters providing network connectivity or high speed access to data (storage attachments like Fiber Channel, ESCON and so on) are connected to a processor, with its local memory, through the PCI bus. These PCI-based adapters could be off-the-shelf firmware created by vendors for the mass market or these could be custom built for the firmware configuration at hand. Typical server systems need to be connected to a variety of adapters to provide connectivity and high speed access to data. One prevalent means of doing so is through a local bus, such as the PCI (Peripheral Component Interconnect) bus. The PCI bus supports multiple adapters on a single bus, and provides high data transfer capabilities.

Although PCI based components are designed to conform to a standard, there are numerous occasions when the incompatibilities between the different components in the system, or bugs in the code, can cause the PCI bus to hang. When this happens, data transfers across the bus come to a halt, since the bus is now inaccessible to all agents. Moreover, the only reliable way of resuming operation is to assert a PCI RST# (reset) signal, which also has the undesirable effect of resetting all the trapped error information in the PCI agents. Thus, there is little information to aid in debug efforts, and little reliability can be achieved due to the lack of proper recovery from such a situation.

Typically, the processor program (software) partitions the memory map of the PCI system and allocates memory to each unit or adapter on the bus. Thus, the local data store or (LDS) of the processor complex could have different regions. One region is a user area which is accessible to all units. A second region is for exclusive use of a first unit. The memory map might include any combination of these regions. One important exclusive-use area in this LDS would be memory reserved for the exclusive use of the processor complex unit. This would be the area where the processor stores code to execute, possibly including code used to recover from an error condition.

There is a need to protect certain areas of memory so that only adapters/units on the bus that have been defined to have access authorization to the protected area are able to write to those areas. Without this, an errant adapter (through a micro code or hardware failure) could trash key areas of memory and corrupt it and thus exposing the system to unpredictable results. For example, an errant LAN adapter on the bus could overwrite certain recovery routines in the area of memory where the processor complex has stored such routines. Subsequent recovery action in the system would fail and produce unexpected results.

As explained in the example above and in some other instances the configuration of a PCI address map contains regions of memory deemed protected whose access is restricted to the processor alone. An errant access to this protected region of memory, either due to a hardware or code problem, results in an aborted access on the PCI bus, which manifests itself either as a PCI Target Abort or a PCI Master Abort. There are several other scenarios which cause a similar response on the PCI bus, thus making it difficult to tell one scenario from the other. Fault isolation under such conditions becomes extremely difficult, time consuming and costly and may influence customer satisfaction. This problem becomes even more serious when used with over the shelf components, be it PCI or any other bus. The main reason is that many off-the-shelf type hardware that is often used by most manufacturers does not afford the flexibility to isolate errors with any appreciative granularity. This results in generic error or FRU calls, including replacing of complete I/O subsystems, since detailed information about the error is not available. Therefore, a new system is needed that can isolate errors and provide memory protection. The new system needs to eliminate or substantially reduce debug time by pinpointing the kind of error, as well as making FRU calls easier to handle by pinpointing the source of the error.

The present application is being filed on the same day as related application, attorney docket PO9-99-002, titled "SYSTEM AND METHOD FOR SELECTIVELY RESTRICTING ACCESS TO MEMORY FOR BUS ATTACHED UNIT IDs."

SUMMARY OF THE INVENTION

It is an object of the present invention to describe a new, unique means of identifying a hung PCI bus.

It is another object of the present invention to trap relevant and sufficient error information in case of a hung bus.

It is yet another object of the present invention to provide fail-safe access to the processor to obtain status information, so that appropriate action can be taken when an error is detected, including, but not limited to, a FRU (Field Replacement Unit) call, which would identify errant firmware to the IS operator for remedial action.

A method and apparatus for detection of a bus hang with identification and capturing of errors in a network computing environment having at least one bus. A first and a second unit are in processing communication with one another in the environment and both units are capable of transferring data between one another. A status circuit is provided for monitoring the first and second units as well as a counting circuit that is measuring periods of bus inactivity during an active bus transfer sequences. A compare circuit is in processing communication with the first and second units for comparing threshold counts provided with a threshold value circuit. Finally, an error detector mechanism that is responsive to the threshold circuit is provided, capable of detecting a bus hang condition, where the detector asserts an error indication when appropriate.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
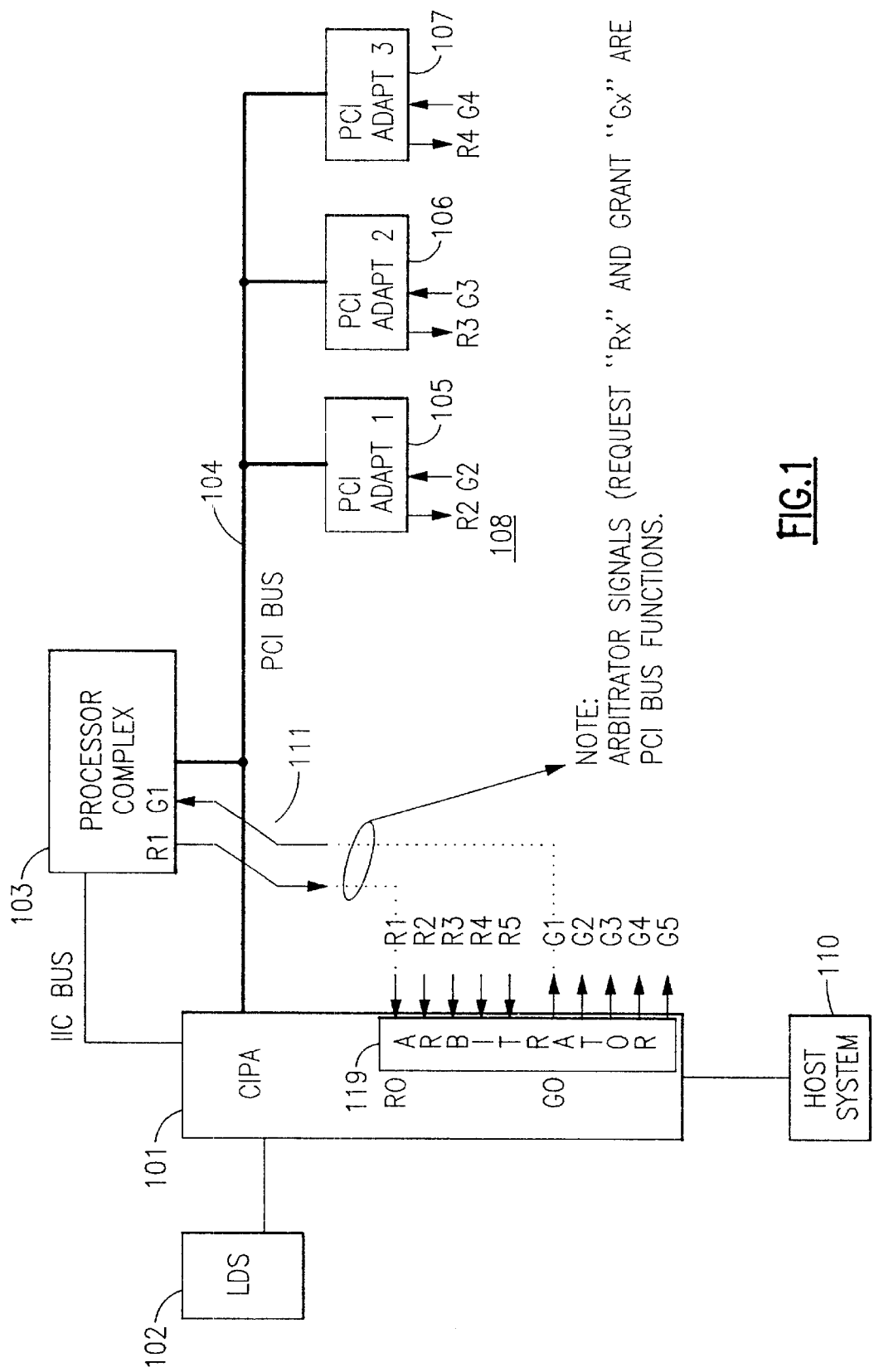
FIG. 1 is a high level schematic diagram of a system connected by use of a PCI bus as per one embodiment of the present invention.

FIG. 1 is one embodiment of the present application having a Peripheral Component Interconnect or PCI bus as shown at 104, connecting multiple adapter units as shown at 105, 106, and 107. In other embodiments other types of busses can be substituted for the PCI bus and the PCI bus is this example is only used for illustrative purposes. The PCI adapt 1 shown at 105 is specified as the first unit. A processor complex unit shown at 103, is also specified as the third unit and is used for controlling the operation of the adapter system. A "Customized Intelligent PCI Agent". unit (hereinafter CIPA) "bridge" adapter is specified as the second unit and shown at 101. This adapter is used for arbitrating requests on the PCI bus and providing memory control function for an LDS memory shown at 102, as well as providing a high speed interface to a "Host" computer shown at 110 and providing support logic for error handling and recovery. A separate path is provided for the Processor complex to the CIPA via a two wire IIC bus. This path is used to allow the Processor to perform status and recovery activity when the PCI bus can not be used or is not operable.

Each adapter has a unique pair of request (Rx) and Grant (Gx) signals associated with the PCI protocol. In FIG. 1, the Processor complex R1,G1 wires are shown connected to the arbiter 109. Each adapter is similarly wired to the arbiter. The arbiter in this example is contained in the CIPA logic and the CIPA adapter must arbitrate for the bus as well. Therefore, the CIPA arbitrates on R0,G0 internally to the CIPA logic.

In normal operation, one of the units (101,103,105,106, 107) will request exclusive use of the PCI bus by asserting its unique Request (Rx) signal. The Arbitration/Arbiter (109) logic will select one of the requesters and asserts the appropriate Grant (Gx) signal. Once an adapter receives a Grant (Gx) it has exclusive control over the PCI bus.

It is obvious that the Arbiter in this scheme is always aware of which adapter is in control of the PCI bus. Thus, the CIPA logic can keep separate status records for each adapter by assigning status registers to each adapter ID. Since the Arbiter can determine which adapter is active at any time, the Arbiter can assign an ID to each adapter. Alternatively, the CIPA could keep a copy of the most recent events for recovery purposes.

Figure 7A:
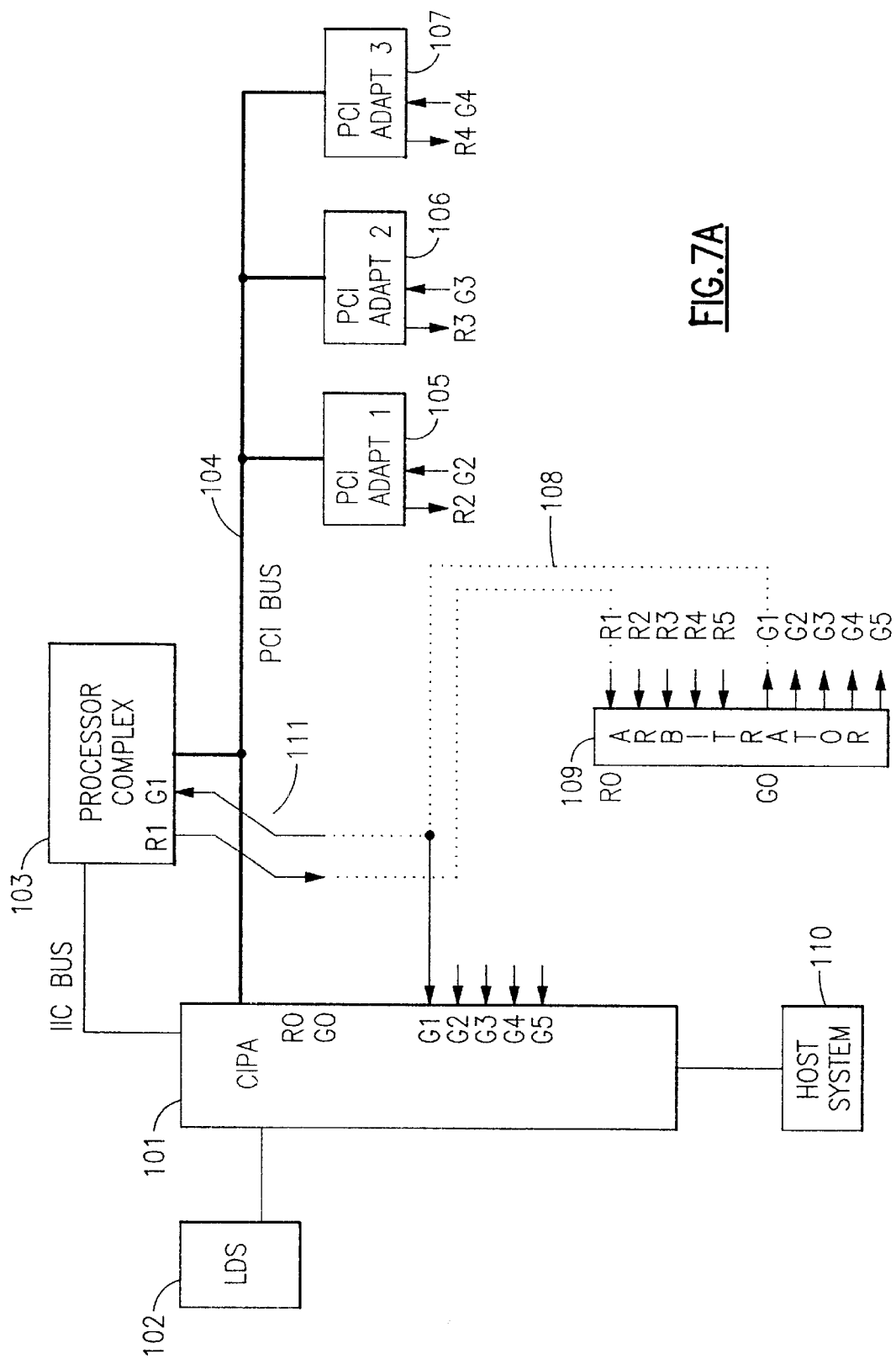
FIGS. 7a and 7b are high level schematic diagrams of alternate multi-adapter bus systems with variations on detecting the adapter ID that has won bus arbitration as per one embodiment of the present invention.

FIG. 7a shows another PCI implementation where the Arbiter logic is separate from the CIPA adapter. In this case, each request/grant pair is wired between the adapter and the Arbiter as before, however each Grant line is additionally wired to the CIPA logic. Thus, the CIPA can sense all Gx lines and determine which adapter is in control at any time. FIG. 1b shows another PCI scheme. In this case the Arbiter is separate from the CIPA logic and supplies an encoded ID# to the CIPA to inform the CIPA logic which adapter is active at any time.

Figure 7B:
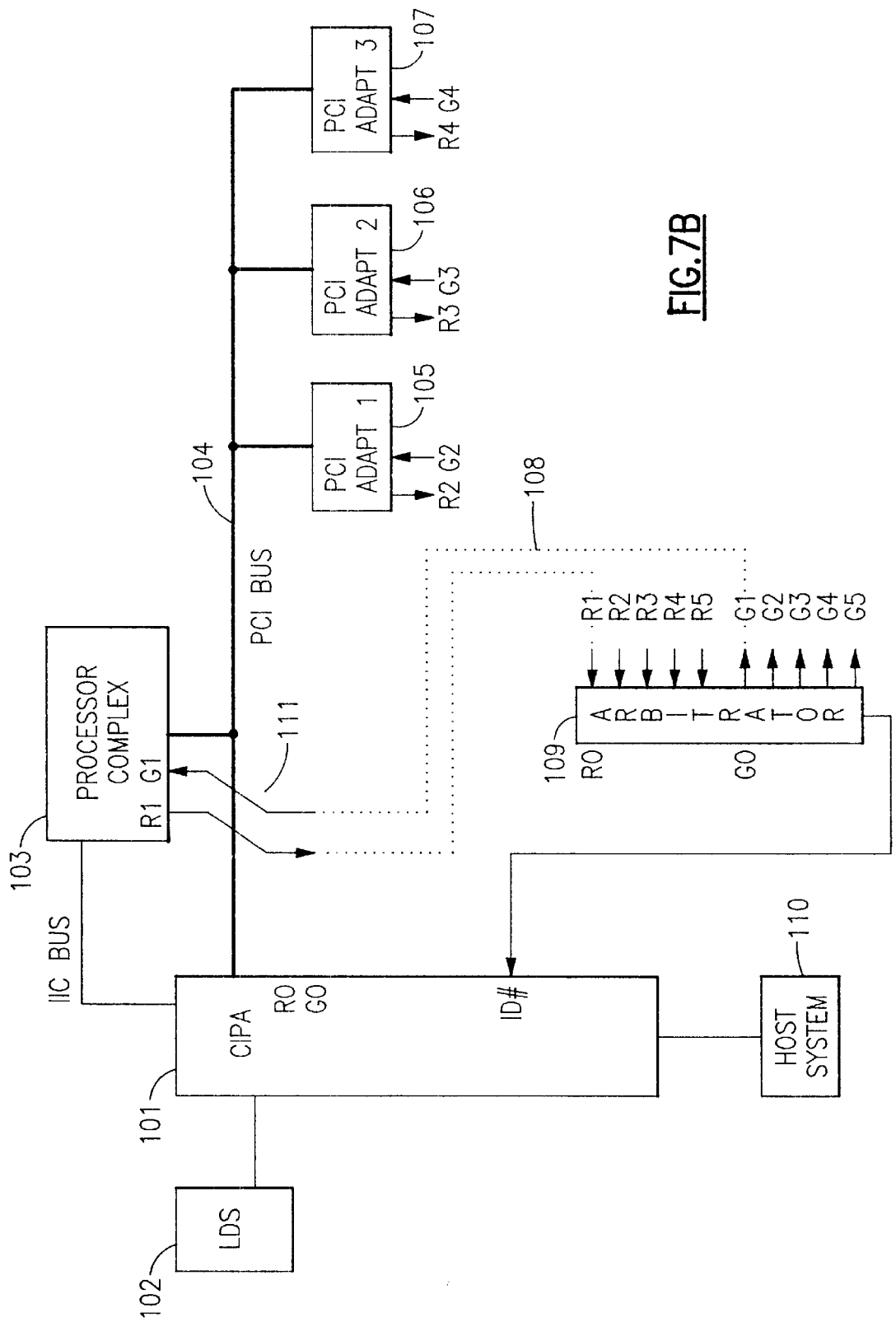

In FIGS. 7a and 7b, only one RxGx pair is shown wired for simplicity of explanation. It should be understood that all adapters must have their RxGx wired to the Arbiter to participate on the common PCI bus.

Figure 2:
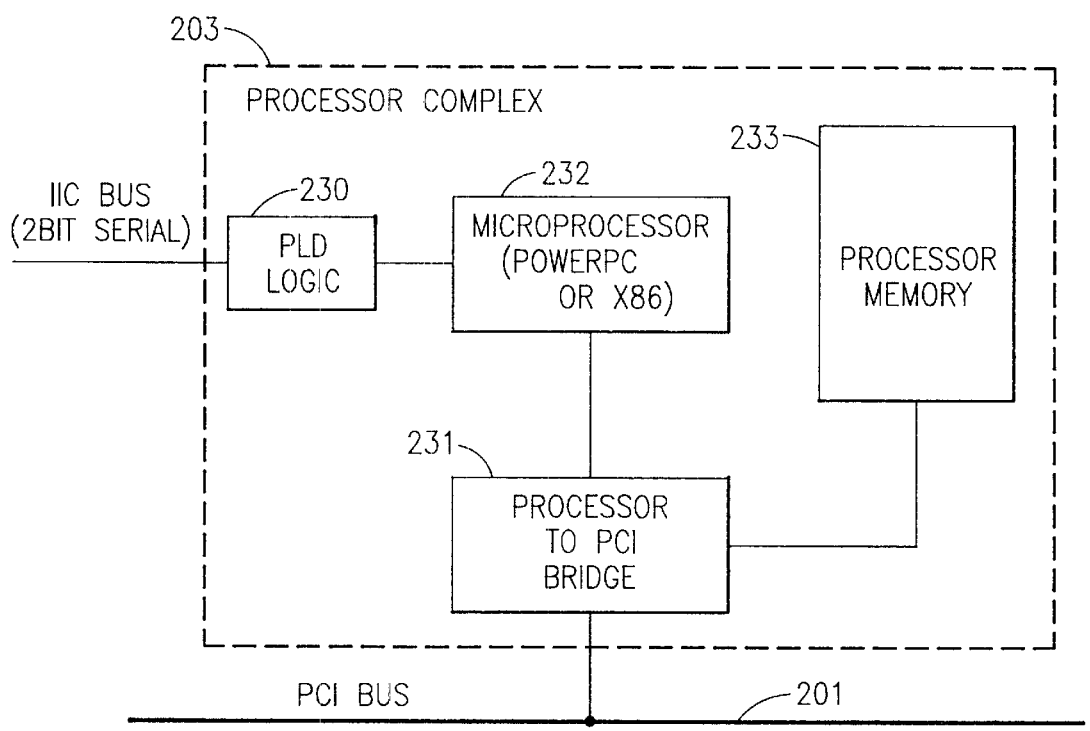
FIG. 2 depicts a timing diagram for a PCI bus as per one embodiment of the present invention.

FIG. 2 illustrates some of the details of the CIPA adapter as per another embodiment of the present invention. A Microprocessor shown at 232, such as a PowerPC or an X86, is connected to its local memory shown at 233 and the PCI bus via a "bridge" function shown at 231. A Programmable Logic Device (PLD) shown at 230 provides a multi bit serial interface, preferably a 2 bit serial interface, between the Processor and the CIPA adapter (for use when the PCI bus is unavailable).

Figure 3:
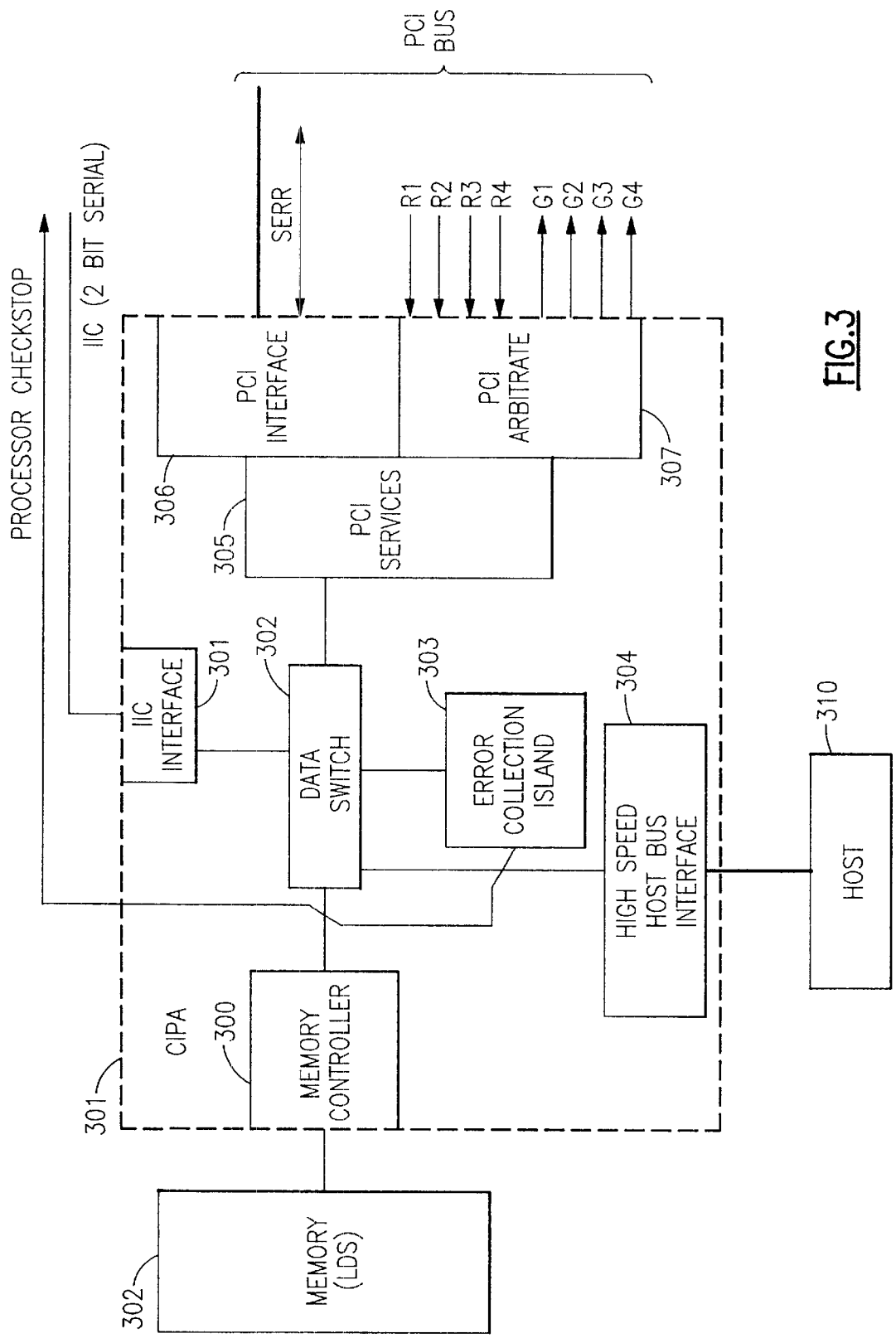
FIG. 3 is a schematic diagram of the major components of a memory controller "Customized Intelligent PCI Agent" (CIPA) as shown in the embodiment of FIG. 1.

FIG. 3 depicts the details of the CIPA adapter as per one embodiment of the present invention. A Data Switch shown at 302 provides a path between each of the functional entities. The IIC interface shown at 301 converts the IIC serial interface into internal bus widths. The Memory controller shown at 300 controls communication between the CIPA and the LDS. The High Speed Host Bus interface (304) provides a high speed communication port to a Host system. The PCI bus is supported by the PCI Interface logic shown at 306 and the PCI Arbiter shown at 307. Bus status, controls and architecture is supported by the PCI services shown at 305. Error status and handling is supported by the Error collection island shown at 303. The CIPA can signal the processor of an error condition by asserting the Processor check stop signal based on the state of the Error collection island registers.

Figure 4:
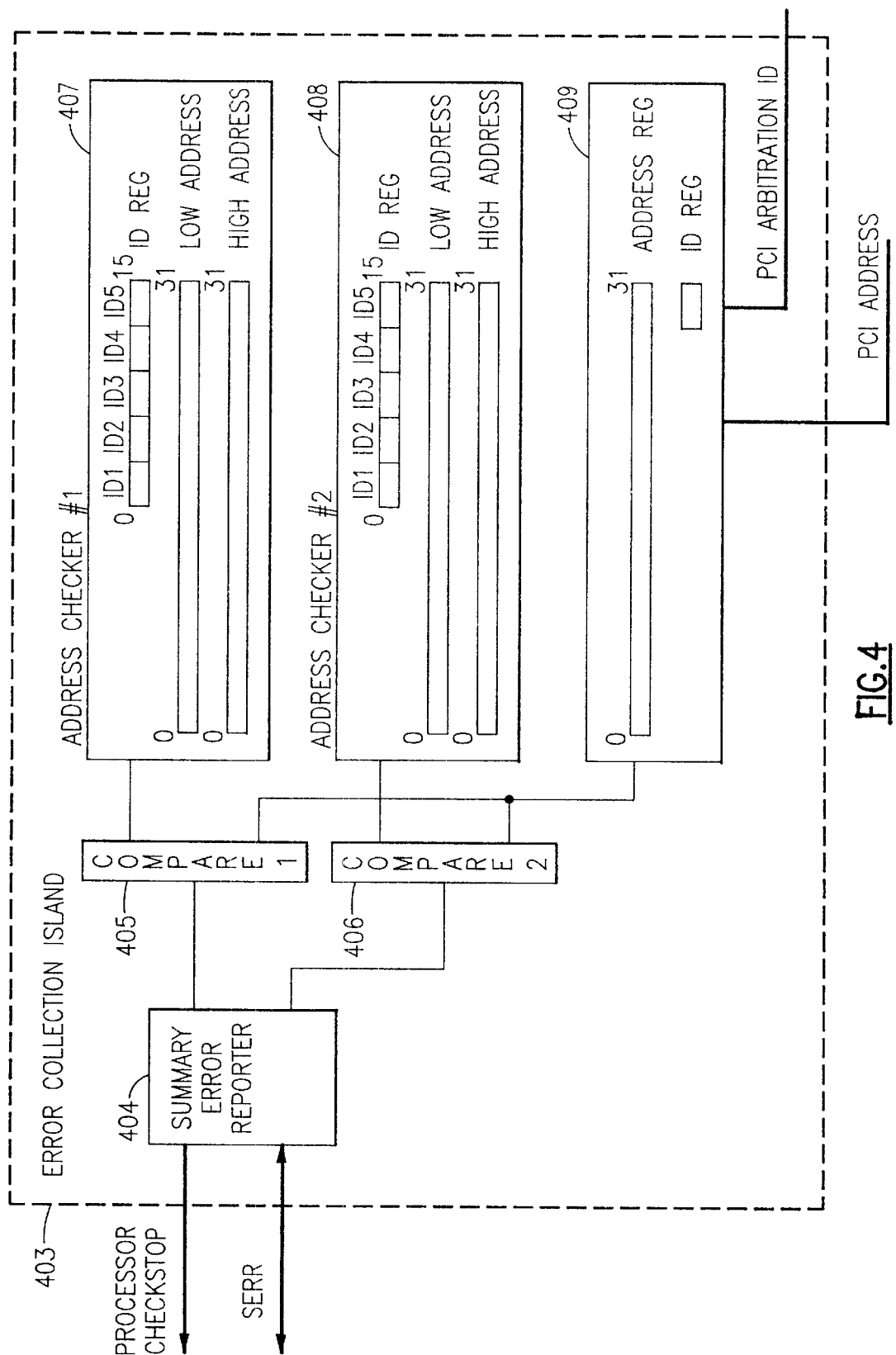
FIG. 4 is a schematic diagram of the major components of an error collection island as shown in embodiment of FIG. 3.

FIG. 4 is a depiction of the error collection island (shown at 403 as per another embodiment of the present invention. Address registers shown at 409 hold the current (LDS) address from the PCI bus transaction. It also holds the ID of the adapter associated with the address. The Address checkers shown at 407, and 408 hold protected ranges of LDS memory. Both the Low address shown at 419 and the High address shown at 418 are loaded into registers. These (second address) addresses define a range of LDS memory that is protected for the use of only the adapters with corresponding IDs set in the (Second ID) ID register shown at 420. An address register is compared with the ranges in the address checkers shown at 407 and 408. If the address is within the range of a checker, the ID register must be compared with one of the ID registers in the checker or a signal is sent to the Summary Error Reporter shown at 404. Here an error can be signaled to the Processor complex and the offending ID and Address can be analyzed for recovery purposes.

Figure 5:
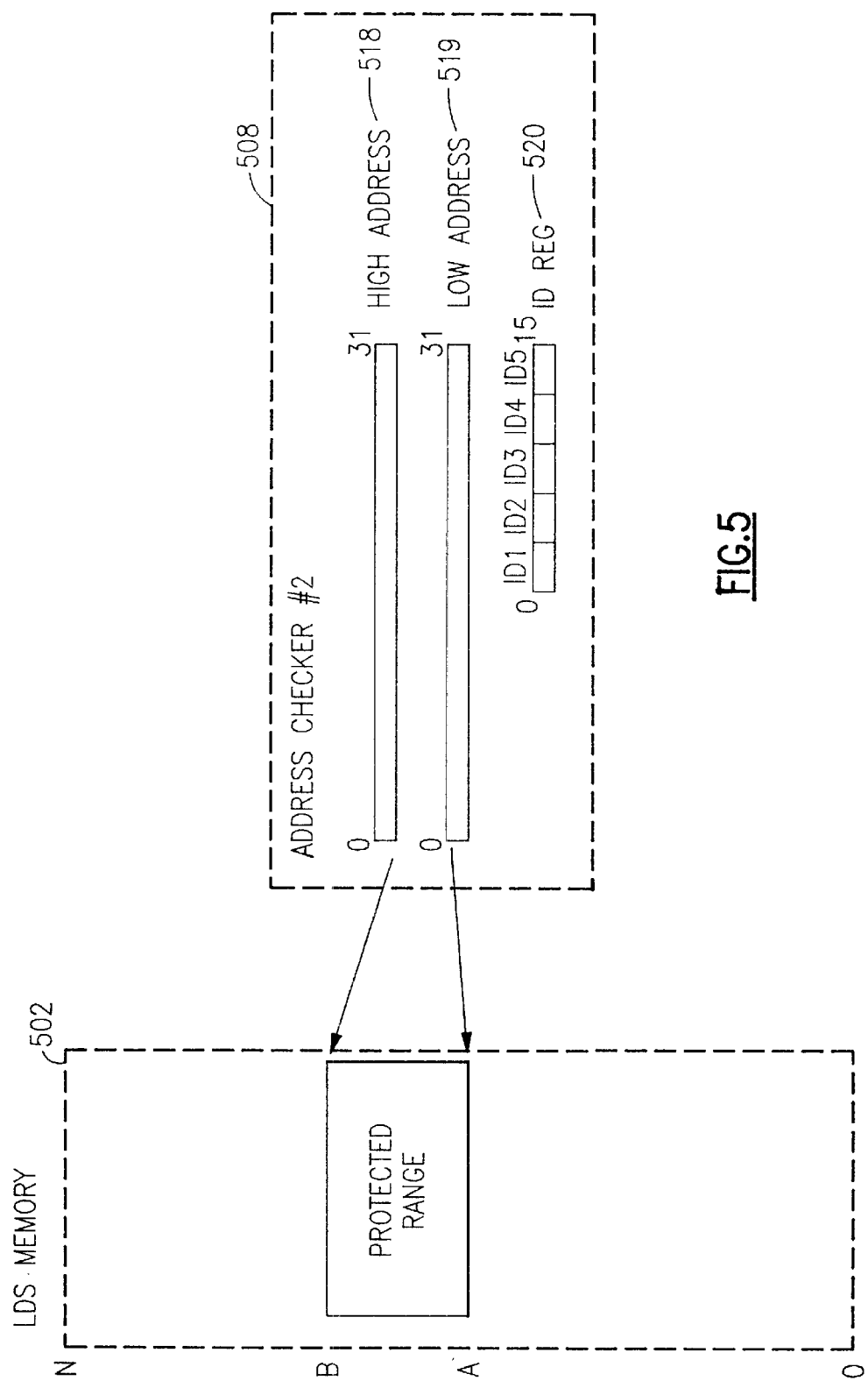
FIG. 5 illustrates an implementation of the selective protection scheme as per one embodiment of the present invention.

This comparison is more clearly shown in FIG. 5. The LDS protected range (a::b) is set into the Address Checker #2 shown at 508. Any adapter attempting an access to this range must have its ID set into the ID reg 520 or an error will be indicated.

Memory Protection:

Defining the Memory protection ranges and assigning access to adapter IDs would typically be done at initialization time, when the memory map of the subsystem is being created by the processor, but protection can also be created/changed at any time. In general, the processor would create a memory map, carving out areas of memory and configuring PCI configuration registers with the appropriate information to allocate certain areas of memory to each agent as shown in FIG. 5.

The next step in the process is for the processor to configure the CIPA (1) that is going to enforce the protection with the relevant information regarding protected memory space segments. For this purpose, the CIPA would contain several address register checkers: A lower bound address specification register (518) as well as an upper bound address specification register (519). For each register pair, the CIPA would also maintain a 15-bit register (120) that will store all 3-bit ids of bus agents to identify all agents that will have (as a group) exclusive access to the portion of memory identified by the lower and upper bound address registers. These 3-bit ids actually correspond to the REQ#/GNT# pair identification for the agent at hand. These sets of 3 registers will be needed for as many partitions of protected memory the CIPA will allow.

Note that these sets of 3 registers for each segment of protected memory are in addition to all the required PCI config registers as specified in the PCI specification. With these registers thus defined and configured, the CIPA can now enforce the memory protection. FIG. 4 shows status registers which are the active address and unit ID of the current PCI bus transaction. All of these registers are potentially memory mapped so they can be read and written as part of the Status information used in error analysis and recovery software routines.

Checking Illegal Accesses to Protected Memory:

For each address cycle on the bus, the CIPA will perform a computation in addition to the normal decode function by each slave unit on the local bus. This computation is to capture the ID of the master unit (agent) through the use of the GNT# signal that is accessible to the CIPA, and compare the address of the access to the protected region of memory defined in its registers. All comparisons to the different areas of memory take place in parallel, so there are no bus cycles lost over and above the decode process regularly underway. If the CIPA is not the target of the access, no further action is taken. If the CIPA is the target of the access, then the result of the additional computation described above also comes into play. If the area of memory being targeted is protected (as defined in any of the upper/lower address register pairs), then the CIPA determines if the id of the master matches that in the corresponding id register linked with the protected memory definition registers. If it does, the access is allowed and the transfer completes normally.

If the above computation shows that an agent other than that authorized to use that segment of memory, is attempting to access it, then a error condition "Protected Memory Access Error" is signaled internally in the CIPA. One of the immediate results of such an error is to terminate the access on the bus with a "Target Abort", thus preventing access to the protected region of memory.

While the master of the access on the PCI bus sets the "Received Target Abort" bit in its configuration space as per the PCI spec, the CIPA takes a more advanced error response to this condition:

The "Signaled Target Abort" bit is set in the configuration space as defined in the PCI spec.

The id of the master is trapped in the "Master Identification Register" within the CIPA.

The address being accessed is trapped in the "Protected Address Error" register within the CIPA.

An error condition is set with the error indicator "Protected Memory Access Error" bit set in the Error Register.

Providing Access to the Stored Error Information:

The CIPA follows a rather elaborate scheme to provide a fail-safe mechanism to ensure that the processor will have access to this error information. The following is done:

All error indications described above, except the "Signaled Target Abort" bit in the PCI config space, are not reset by the PCI RST# (reset) signal.

This ensures that the error indication will not be lost except through a chip reset asserted to the CIPA through a special hard reset signal from the processor that is decoupled from the PCI RST# signal.

All the registers mentioned in above are memory mapped to the PCI bus so that the processor can access these from the PCI bus and reset them as needed.

A special IIC interface is provided to the processor, to access CIPA internal registers, including all the registers mentioned above.

This special IIC interface ensures that even if the PCI bus is not available, the processor can have access to the internal error registers inside the CIPA and reach a determination as to the cause of the error.

Following the indication of a "Protected Memory Access error," the processor can note the id of the errant master and the address it was trying to access. It can then retrace its own address pointers for the last few accesses, and determine if the problem was caused by:

a bad address pointer in the code running on the processor, or a problem with the firmware of the PCI adapter card identified as the master above.

Once the determination has been reached, the operator can be informed of the required action to call a FRU (Field Replacement Unit) for the micro code on the processor, or more likely, the exact PCI adapter card from the several cards plugged into the system.

Thus, this mechanism has the following key advantages:

Protects key areas of memory from corruption

Prevents need for costly and time-consuming debug in the event of a failure

Provides immediate identification of failing component for prompt action.

This invention has been described with a specific memory protection scheme only for illustrative purposes. There are many cases where resources could be customized for each adapter that would use this invention Status recording is but one example. There are many methods known in the art for protecting memory as apparent to those skilled in the art. Any of these methods can easily be substituted or used in conjunction with the previous embodiments as explained by this invention. For example, memory ranges could be identified by use of a single address register identifying the starting address of a protected range and a length register specifying the block size to be protected. In an alternate scheme, memory could be broken up into equal sized segments and each segment could have IDs assigned to it. Thus in a 64 Kbyte memory for example, the memory can be broken into 8 equal 8K segments, and only the high order 3 bits of address are needed for comparison. In yet another alternate embodiment, the ID field would indicate that the range was not accessible to the adapter matching the ID rather than indicating that the ID was permitted access to the range. Other controls could be added to the invention as well indicating that the ID was permitted read only access to a range or that the ID was permitted to write to a range.

Furthermore, as explained earlier, this invention has been described for a PCI bus implementation for illustrative purposes only. However, other bus architectures could equally take advantage of this scheme. For example, a bus that implements a Polling scheme would associate an ID with the polled address. A token passing scheme might have a source ID field as part of a Frame Header that could be used to identify the adapter. This invention is intended to teach the concept of associating a protected range of memory with an adapter. Any means of identifying which adapter is associated with an address to memory would be able to use this invention. In fact, the invention could be practiced by protecting memory ranges from all adapters except one or more specified adapters. Referring to FIG. 7a, if only the Processor complex generated a signal to the CIPA (such as G1 shown) then only the Processor complex would be permitted to access a protected range (since no other IDs were implemented).

Figure 6A:
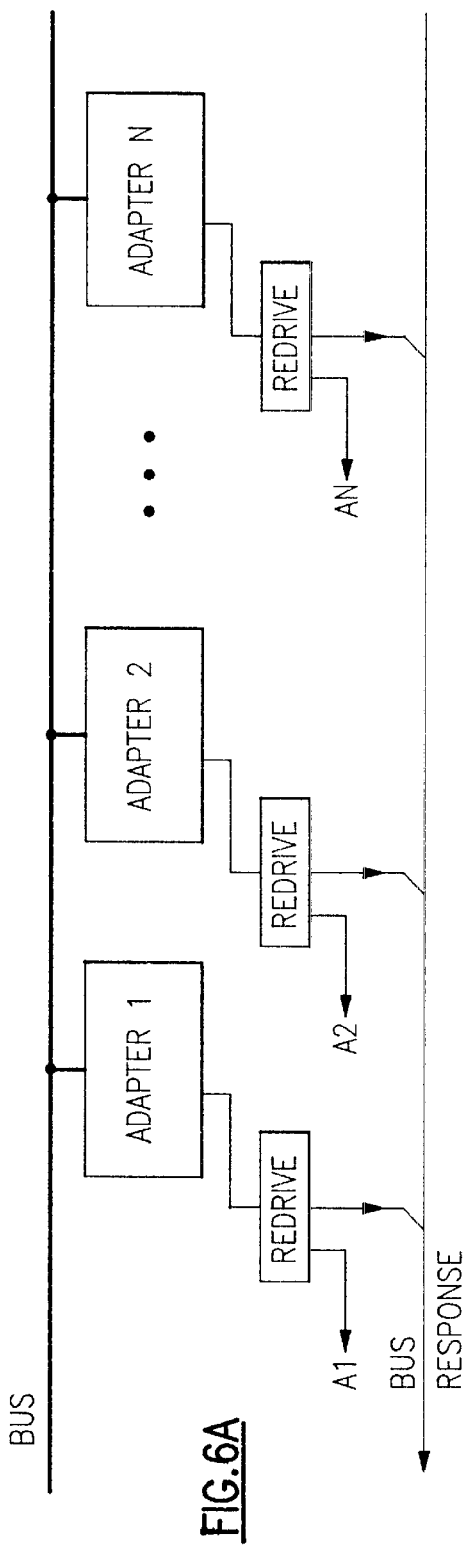
FIGS. 6a and 6b show methods to detect IDs on daisy chained bus protocols as described per one embodiment of the present invention.
Figure 6B:
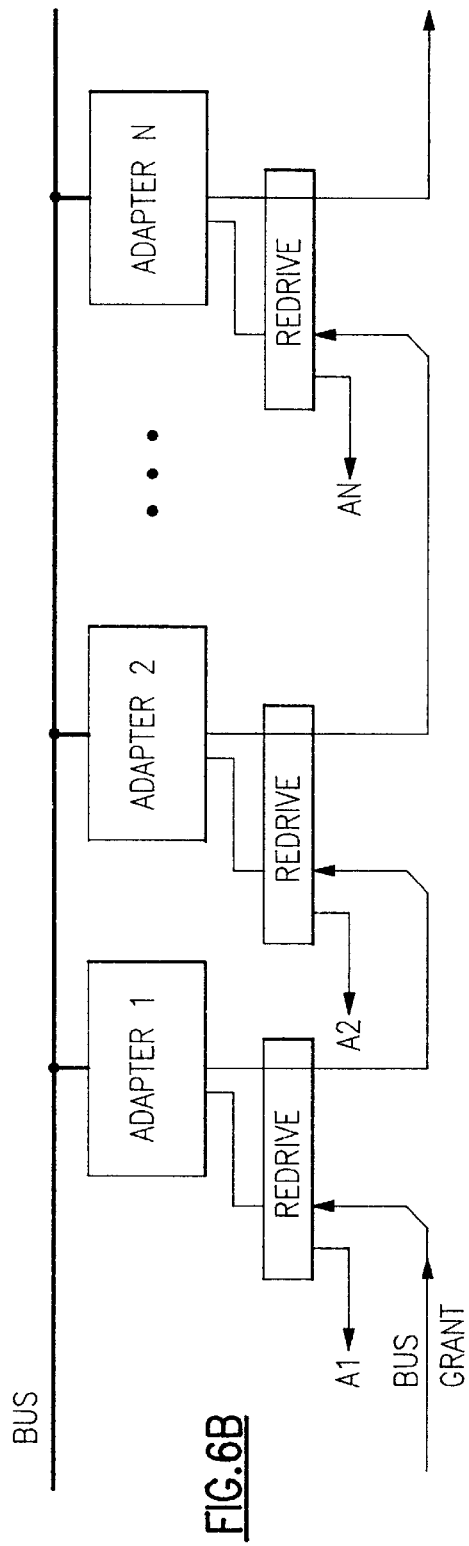

FIGS. 6a and 6b shows an alternate embodiment of the present invention using a daisy chained bus. Here Adapters 1,2 . . . n are connected to a common bus. Logic is added (redrive) that detects an adapter driving a common response bus signal and forwards a signal (A1, A2, An) to a circuit to identify the ID of the adapter owning the bus. Of course such logic could be incorporated in the Adapter but it is shown separately for clarity. Similarly, FIG. 6a shows a daisy chained grant signal protocol where special logic (Redrive) monitors the chain at each adapter to drive signals A1, A2 . . . or An to identify the owner of the bus.

Identification of Hung Bus:

Numerous simple procedures utilizing counters can be used to determine if the any bus, PCI or otherwise, is hung. However, the mechanism used here is unique in the manner it determines if the bus is hung. A 32-bit counter is contained within the CIPA. This is set to a large initial value (based on application) at initialization time. Each time a new access starts on the bus, this counter value is loaded into a "hang detection counter." This counter starts at the pre configured value above, and counts down from there. This counter only counts consecutive cycles without data transfer on the bus when the bus is not idle. As soon as any data transfer occurs on the bus, the counter is reset to its initialized (high) value, and the countdown begins again. When the bus is idle, the counter does not count down.

Thus, this counter will continue to count down only when a master and target are engaged on the bus and cycle-after-cycle there is no data being transferred between them. The counter would eventually count down to zero if there has not been a data transfer on the bus between an active master and slave connection (bus not idle) for a huge number of cycles (equal to the initialized value of the counter). At such a point, the PCI bus would be deemed hung.

This mechanism is better than the usual one of creating a big counter to countdown the length of an entire access, with the aim of making the counter value far bigger than the largest expected length of data transfer on the bus. This strategy has the disadvantage of not allowing potentially very long bursts of data from a single agent to a slave, since the transfer would have to be terminated and then started again, to prevent the counter from running over. The new counter design described earlier truly identifies a "hung" bus in a more conclusive manner.

Trap Relevant Error Information:

Once the counter counts down to zero, the following actions occur within the CIPA:

An error condition "PCI Bus Hang Detected" is set

The processor is notified through an SERR# indication or other means like asserting an interrupt directly to the processor if such a means exists. Another possible means of allowing a processor to find out about a hung bus is to rely on its internal code timers to "detect" a fatal error that is preventing completion of PCI accesses.

Enhanced error information trap: Registers within the CIPA trap relevant bus hang information:

An address register within CIPA is used to trap the address of every single access on the bus. This register is overwritten with the new address of a fresh address cycle only after the current access has completed normally. Once a bus hang occurs, this address is trapped into the "Hung Bus Target Address Register".

The id of the master on the bus is trapped into a "Master identification Register." This register, under normal operation, tracks the identity of each bus master for the entire extent of its access on the bus.

Recovery:

When the bus is hung, there is no way to access the information in the registers above through regular bus operation. The only means to access these through the PCI bus is to first assert a PCI RST# (reset) so that the bus hang condition is cleared. All the registers mentioned above are designed to be memory mapped onto the PCI bus, and be unaffected by a PCI RST# signal. These registers are only reset by an exclusive reset signal from the processor that is decoupled from a PCI RST#. Thus, the processor can reset the PCI bus and still access these registers inside the CIPA to identify the errant agents on the bus.

In an alternate embodiment, another method is provided to guarantee fail-safe access of these registers to the processor. This mechanism is through a IIC interface to this CIPA from the processor. The registers mentioned above are fully accessible through this interface as well. Thus, a time-out condition on access to the PCI bus can cause the processor to directly access the main Error register inside the CIPA through the IIC interface. This main Error register would identify the condition to be a "PCI Bus Hang Detected" error, and the processor can then proceed to read the other registers mentioned above to identify the agents of the transfer.

The processor can then algorithmically determine which agent to take off-line or call for a FRU (Field Replacement Unit). It could, if so designed. opt to take both agents off-line and request a FRU for both agents.

This process has thus saved a lot of hard debug effort and has efficiently resulted in the right replacements of the defective parts.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. In a computing network environment having at least one bus and a plurality of units, a method for detecting a bus hang during transmission of data comprising the steps of:

a) providing a location in said environment to place all current values used in data transmission into a plurality of status registers;

b) providing a counter in said environment and setting said counter to an initial value in a non-idle bus cycle;

c) timing all elapsed times during consecutive cycles without data transfer on the bus when the bus is not idle;

d) asserting an error condition if said timer finds a preset threshold value; and e) repeating steps b through d until transmission is complete or a bus hang is detected.

2. The method of claim 1, wherein said initial value in a certain non-idle cycle is a count based on said current counter value with an offset.

3. The method for detecting a hang bus during a transmission of data of claim 1 wherein the timing function is a synchronous to the bus cycle.

4. The method of claim 1, wherein the step of asserting an error condition includes saving an id of any unit that was active during said transfer.

5. The method of claim 1, wherein the step of asserting an error condition includes saving any address that was active during the transfer.

6. The method of claim 1, wherein the step of asserting an error condition includes saving status information related to units that were participating in said transfer when said bus hang was detected.

7. The method of claim 1, wherein status information is retained in registers that are memory mapped in said environment.

8. An apparatus for capturing error information after a bus hang condition, said apparatus comprising:

a processor for processing data;

at least one adapter unit;

a primary bus connected between said processor and said adapter unit, said primary bus for transmitting data between said processor and said adapter unit;

a controller for controlling data transfers over said primary bus between said processor and said adapter unit;

registers in said controller for recording status information collected during the transfer of data over said primary bus;

an error detection mechanism for detecting a bus hang condition in said primary bus; and a secondary bus between said processor and said controller for transmitting status information recorded in said registers to said processor when said error detection mechanism detects a bus hang condition in said primary bus.

9. The apparatus according to claim 8 wherein said error detection mechanism comprises:

a counting circuit starting counting upon new access starts on the primary bus during an active bus transfer sequence; and a compare circuit comparing a threshold value to counts from said counting circuit to detect a hang bus condition.

10. The apparatus according to claim 9 wherein said counting circuit is reset to a set number and counts down, and upon reaching zero, detects a hang condition.

11. The apparatus according to claim 8 wherein said counting circuit counts consecutive cycles without data transfer on the bus when the bus is not idle.

12. The apparatus according to claim 11 wherein said counting circuit is reset to its initial value when data is transferred on the bus, and wherein the counting circuit does not count when the bus is idle.

13. An apparatus for detecting a hang condition in a bus transferring data, said apparatus comprising:

a counting circuit starting counting upon new access starts on the bus during an active bus transfer sequence; and a compare circuit comparing a threshold value to counts from said counting circuit to detect a hang bus condition.

14. The apparatus according to claim 13 wherein said counting circuit is reset to a set number and counts down, and upon reaching zero, detects a bus hang condition.

15. The apparatus according to claim 13 wherein said counting circuit counts consecutive cycles without data transfer on the bus when the bus is not idle.

16. The apparatus according to claim 15 wherein said counting circuit is reset to its initial value when data is transferred on the bus, and wherein the counting circuit does not count when the bus is idle.

17. An method for capturing error information in a system having a processor for processing data, at least one adapter unit, and a primary bus connected between the processor and the adapter for transmitting between the processor and the adapter unit after a bus hang condition in the primary bus, said method comprising:

controlling with a controller, data transfers over said primary bus between said processor and said adapter unit;

recording in registers in the controller, status information collected during the transfer of data over said primary bus;

detecting a bus hang condition in said primary bus; and transmitting said status information recorded in said registers to said processor over a secondary bus between the controller and the processor when a bus hang condition in said primary bus is detected.

18. The method according to claim 17 wherein said error detection comprises:

starting counting with a counting circuit upon new access starts on the primary bus during an active bus transfer sequence; and comparing a threshold value to counts from said counting circuit to detect a bus hang condition.

19. The method according to claim 18 further comprising setting said counting circuit to a set number, and counting down from said set number upon predetermined events until reaching zero, thereby detecting a bus hang condition.

20. The method according to claim 19 wherein said predetermined event comprises detecting consecutive cycles without data transfer on the bus when the bus is not idle.

21. The method according to claim 19 further comprising resetting said counting circuit to its initial value when data is transferred on the bus, and wherein the counting circuit does not count when the bus is idle.

* * * * *

UNITED STATES PATENT AND TRADEMARK OFFICE
CERTIFICATE OF CORRECTION

PATENT NO. : 6,453,429 B1
DATED : September 17, 2002
INVENTOR(S) : Sumit Sadana

It is certified that error appears in the above-identified patent and that said Letters Patent is hereby corrected as shown below:

<u>Column 9,</u>
Line 18, delete "a synchronous" and insert -- asynchronous --

Signed and Sealed this

Nineteenth Day of August, 2003

JAMES E. ROGAN
*Director of the United States Patent and Trademark Office*